(12) United States Patent
Damm et al.

(10) Patent No.: US 10,566,584 B2
(45) Date of Patent: Feb. 18, 2020

(54) ELECTRICAL STORAGE SYSTEM WITH A SHEET-LIKE DISCRETE ELEMENT, SHEET-LIKE DISCRETE ELEMENT, METHOD FOR PRODUCING SAME, AND USE THEREOF

(71) Applicant: SCHOTT AG, Mainz (DE)

(72) Inventors: Thorsten Damm, Nieder-Olm (DE);
Ulrich Peuchert, Bodenheim (DE);
Nikolaus Schultz, Essenheim (DE);
Miriam Kunze, Saulheim (DE);
Clemens Ottermann, Hattersheim (DE)

(73) Assignee: SCHOTT AG, Mainz (DE)

( * ) Notice: Subject to any disclaimer, the term of this patent is extended or adjusted under 35 U.S.C. 154(b) by 177 days.

(21) Appl. No.: 15/386,066

(22) Filed: Dec. 21, 2016

(65) Prior Publication Data
US 2017/0104192 A1    Apr. 13, 2017

Related U.S. Application Data (63) Continuation of application No. PCT/EP2015/064058, filed on Jun. 23, 2015.

(30) Foreign Application Priority Data

Jun. 23, 2014   (DE) .................. 10 2014 008 934
Jun. 23, 2014   (DE) .................. 10 2014 008 936
(Continued)

(51) Int. Cl.
*H01M 2/02*    (2006.01)
*C03C 3/087*   (2006.01)
(Continued)

(52) U.S. Cl.
CPC .......... *H01M 2/0292* (2013.01); *C03C 3/064* (2013.01); *C03C 3/066* (2013.01); *C03C 3/078* (2013.01);
(Continued)

(58) Field of Classification Search
CPC .... H01M 2/0292; H01M 2/0287; H01M 2/08; H01M 6/40; H01M 10/0436; H01M 4/66;
(Continued)

(56) References Cited

U.S. PATENT DOCUMENTS 2,247,331 A   6/1941   Ferguson
4,168,351 A   9/1979   Taylor
(Continued)

FOREIGN PATENT DOCUMENTS

DE   2904396   8/1979
DE   3128863   2/1983
(Continued)

OTHER PUBLICATIONS

Maeda et al., "Diffusion of Li in the silicon oxide films and evaluation of Li-induced surface potential", Applied Surface Science, vol. 244, Issues 1-4, May 15, 2005, pp. 61-64.
(Continued)

*Primary Examiner* — Gary D Harris
(74) *Attorney, Agent, or Firm* — Ohlandt, Greeley, Ruggiero & Perle, L.L.P.

(57) ABSTRACT

An electrical storage system is provided that has a thickness of less than 2 mm and includes comprises at least one sheet-like discrete element. At least one surface of the at least one sheet-like discrete element is designed to be chemically reactive to a reduced degree, inert, and/or permeable to a reduced degree, and/or impermeable with
(Continued)

respect to materials coming into contact with the surface. Also provided are a sheet-like discrete element and to the production and use thereof.

30 Claims, 6 Drawing Sheets

(30) Foreign Application Priority Data

| | | | |
|---|---|---|---|
| Jul. 23, 2014 | (DE) | ........................ | 10 2014 010 734 |
| Jul. 23, 2014 | (DE) | ........................ | 10 2014 010 735 |
| Aug. 14, 2014 | (DE) | ........................ | 10 2014 111 666 |
| Sep. 19, 2014 | (DE) | ........................ | 10 2014 013 625 |
| Dec. 1, 2014 | (DE) | ........................ | 10 2014 117 632 |

(51) Int. Cl.

| | |
|---|---|
| C03C 17/22 | (2006.01) |
| H01M 10/04 | (2006.01) |
| H01M 10/0525 | (2010.01) |
| C03C 3/078 | (2006.01) |
| C03C 3/091 | (2006.01) |
| C03C 3/093 | (2006.01) |
| C03C 3/095 | (2006.01) |
| C03C 3/097 | (2006.01) |
| C03C 17/245 | (2006.01) |
| C03C 3/064 | (2006.01) |
| C03C 3/066 | (2006.01) |
| C03C 3/083 | (2006.01) |
| C03C 3/085 | (2006.01) |
| C03C 3/089 | (2006.01) |
| C03C 3/11 | (2006.01) |
| C03C 17/36 | (2006.01) |
| C03C 23/00 | (2006.01) |

(52) U.S. Cl.
CPC .............. *C03C 3/083* (2013.01); *C03C 3/085* (2013.01); *C03C 3/087* (2013.01); *C03C 3/089* (2013.01); *C03C 3/091* (2013.01); *C03C 3/093* (2013.01); *C03C 3/095* (2013.01); *C03C 3/097* (2013.01); *C03C 3/11* (2013.01); *C03C 17/225* (2013.01); *C03C 17/245* (2013.01); *C03C 17/3668* (2013.01); *C03C 23/002* (2013.01); *H01M 2/0207* (2013.01); *H01M 2/0287* (2013.01); *H01M 10/0436* (2013.01); *H01M 10/0525* (2013.01); *C03C 2217/213* (2013.01); *C03C 2217/281* (2013.01); *C03C 2218/153* (2013.01); *C03C 2218/156* (2013.01); *H01M 2002/0297* (2013.01); *H01M 2220/30* (2013.01)

(58) Field of Classification Search
CPC .. H01M 4/525; H01M 4/131; H01M 10/0585; H01M 10/0525; H01M 2/0267; H01M 2/0207; H01M 2220/30; H01M 10/0562; H01M 2006/0297; C03C 3/11; C03C 17/3668; C03C 3/085; C03C 23/002; C03C 3/064; C03C 3/066; C03C 3/083; C03C 3/089; C03C 3/095; C03C 3/097; C03C 17/245; C03C 17/42; C03C 3/091; C03C 3/093; C03C 3/078; C03C 17/225; C03C 3/087; C03C 2218/156; C03C 2217/213; C03C 2218/153; C03C 2217/281
See application file for complete search history.

(56) References Cited

U.S. PATENT DOCUMENTS

| | | |
|---|---|---|
| 5,338,625 A | 8/1994 | Bates et al. |
| 6,214,061 B1 | 4/2001 | Visco et al. |
| 6,387,563 B1 | 5/2002 | Bates |
| 6,906,436 B2 | 6/2005 | Jenson et al. |
| 6,982,132 B1 | 1/2006 | Goldner et al. |
| 7,211,351 B2 | 5/2007 | Klassen |
| 7,494,742 B2 | 2/2009 | Tarnowski et al. |
| 7,776,478 B2 | 8/2010 | Klaassen |
| 8,228,023 B2 | 7/2012 | Sather et al. |
| 8,420,252 B2 | 4/2013 | Shakespeare |
| 2001/0032666 A1 | 10/2001 | Jenson et al. |
| 2002/0015887 A1 | 2/2002 | Gao |
| 2004/0018424 A1 | 1/2004 | Zhang et al. |
| 2004/0029311 A1 | 2/2004 | Snyder et al. |
| 2004/0186000 A1 | 9/2004 | Kawamoto et al. |
| 2004/0219424 A1 | 11/2004 | Kanno et al. |
| 2005/0037911 A1 | 2/2005 | Fechner |
| 2005/0147877 A1 | 7/2005 | Tarnowski et al. |
| 2006/0006786 A1 | 1/2006 | Fechner |
| 2006/0062904 A1 | 3/2006 | West et al. |
| 2006/0216589 A1 | 9/2006 | Krasnov et al. |
| 2008/0001577 A1 | 1/2008 | Sather |
| 2008/0003492 A1 | 1/2008 | Bates |
| 2008/0003493 A1 | 1/2008 | Bates |
| 2008/0032236 A1 | 2/2008 | Wallace et al. |
| 2008/0213664 A1 | 9/2008 | Krasnov et al. |
| 2008/0263855 A1 | 10/2008 | Li et al. |
| 2009/0057136 A1 | 3/2009 | Wang et al. |
| 2009/0186270 A1 | 7/2009 | Harada et al. |
| 2009/0214899 A1 | 8/2009 | Shakespeare et al. |
| 2010/0104942 A1 | 4/2010 | Lange et al. |
| 2010/0120602 A1* | 5/2010 | Park .................. C03C 3/064 501/21 |
| 2010/0136245 A1 | 6/2010 | Albano |
| 2010/0190051 A1 | 7/2010 | Aitken et al. |
| 2011/0094584 A1* | 4/2011 | Sawada ................ C03C 3/087 136/256 |
| 2011/0098171 A1 | 4/2011 | Pedeboscq et al. |
| 2011/0104034 A1 | 5/2011 | Mills |
| 2011/0190250 A1 | 8/2011 | Yamashita |
| 2011/0281167 A1 | 11/2011 | Sabi et al. |
| 2011/0302962 A1 | 12/2011 | Gattermann et al. |
| 2012/0040211 A1* | 2/2012 | Murata ................ C03B 17/064 429/9 |
| 2012/0050942 A1 | 3/2012 | Kim et al. |
| 2013/0098532 A1 | 4/2013 | Liang et al. |
| 2013/0260230 A1 | 10/2013 | Liang |
| 2013/0344321 A1 | 12/2013 | McSporran |
| 2014/0030449 A1 | 1/2014 | Song et al. |
| 2014/0216108 A1 | 8/2014 | Wiegel et al. |
| 2014/0261662 A1* | 9/2014 | Takeda ............ H01L 31/022425 136/256 |
| 2014/0329140 A1 | 11/2014 | Mikuni |
| 2014/0356694 A1 | 12/2014 | Yoon |
| 2015/0064411 A1 | 3/2015 | Sasai |
| 2015/0079389 A1 | 3/2015 | Krawinkel et al. |
| 2015/0162568 A1 | 6/2015 | Bai |
| 2015/0207184 A1 | 7/2015 | Kunze et al. |

FOREIGN PATENT DOCUMENTS

| | | |
|---|---|---|
| DE | 19810325 | 9/1999 |
| DE | 102010023176 | 12/2011 |
| DE | 102011084128 | 4/2013 |
| DE | 102012206273 | 10/2013 |
| DE | 102012211335 | 1/2014 |
| EP | 2234188 | 9/2010 |
| EP | 2434567 | 3/2012 |
| JP | S5266512 | 6/1977 |
| JP | S54113618 | 9/1979 |
| JP | 2005041768 | 2/2005 |
| JP | 2006056770 | 3/2006 |
| JP | 2006306721 | 11/2006 |
| JP | 2007123081 | 5/2007 |

(56) References Cited

FOREIGN PATENT DOCUMENTS

| JP | 2009161437 | 7/2009 |
|---|---|---|
| JP | 2009181920 | 8/2009 |
| JP | 2010073551 | 4/2010 |
| JP | 2010231969 | 10/2010 |
| JP | 2011054438 | 3/2011 |
| JP | 2011098852 | 5/2011 |
| JP | 2012508446 | 4/2012 |
| JP | 2013026187 | 2/2013 |
| JP | 2014508091 | 4/2014 |
| KR | 1020090061269 | 6/2009 |
| KR | 1020120040683 | 4/2012 |
| KR | 101313156 | 9/2013 |
| WO | 2009119933 | 10/2009 |
| WO | 2013035519 | 3/2013 |
| WO | 2013089347 | 6/2013 |
| WO | 2013141481 | 9/2013 |
| WO | 2013168592 | 11/2013 |
| WO | 2014016039 | 1/2014 |
| WO | 2014062676 | 4/2014 |

OTHER PUBLICATIONS

ISO 7884-8:1987.
ISO 7991:1987.
English translation of Ensling, "Photoelectron spectroscopy examination of the electronic structure of thin lithium"; cobalt oxide layers, dissertation, Technische Universität Darmstadt, 2006.
English translation of Tintignac et al., "Electrochemical properties of high rate bias sputtered $LiCoO_2$ thin films in liquid electrolyte", Journal of Power Sources, vol. 245, 2014, pp. 76-82.
English translation of International Preliminary Report on Patentability dated Dec. 29, 2016 for corresponding PCT/EP2015/064058, 7 pages.
English translation of International Search Report dated Dec. 18, 2015 for corresponding PCT/EP2015/064069.
English translation of International Preliminary Report on Patentability dated Dec. 29, 2016 for corresponding PCT/EP2015/064069, 19 pages.
Song et al., "In situ visible Raman spectroscopic study of phase change in $LiCoO_2$ film by laser irradiation", Chemical Physics Letters, vol. 344, Aug. 24, 2001, pp. 299-304, 6 pages.
English translation of International Search Report dated Dec. 11, 2015 for corresponding PCT/EP2015/064064, 3 pages.
English translation of Written Opinion dated Dec. 11, 2015 for corresponding PCT/EP2015/064064, 13 pages.
English translation of International Preliminary Report on Patentability dated Jan. 5, 2017 for corresponding PCT/EP2015/064064, 16 pages.
English translation of International Search Report dated Dec. 18, 2015 for corresponding PCT/EP2015/064060, 3 pages.
English translation of International Preliminary Report on Patentability dated Dec. 29, 2016 for corresponding PCT/EP2015/064060, 9 pages.
English translation of International Search Report dated Sep. 24, 2015 for corresponding PCT/EP2015/064058.

\* cited by examiner

ELECTRICAL STORAGE SYSTEM WITH A SHEET-LIKE DISCRETE ELEMENT, SHEET-LIKE DISCRETE ELEMENT, METHOD FOR PRODUCING SAME, AND USE THEREOF

CROSS REFERENCE TO RELATED APPLICATIONS

This application is a continuation of International Application No. PCT/EP2015/064058 filed on Jun. 23, 2015, which claims the benefit under 35 U.S.C. 119 of German Application No. 102014008936.3 filed on Jun. 23, 2014, German Application No. 102014008934.7 filed on Jun. 23, 2014, German Application No. 102014010735.3 filed on Jul. 23, 2014, German Application No. 102014010734.5 filed on Jul. 23, 2014, German Application No. 102014111666.6 filed on Aug. 14, 2014, German Application No. 102014013625.6 filed on Sep. 19, 2014, and German Application No. 102014117632.4 filed on Dec. 1, 2014, the entire contents of each of which is incorporated by reference herein.

BACKGROUND

1. Field of the Invention

Electrical storage systems have long been state of the art and include in particular batteries, but also so-called supercapacitors, short supercaps. In particular so-called lithium-ion batteries are being discussed in the field of novel applications such as electromobility, because of the high energy densities that can be realized with them, but they have already been used for a number of years in portable devices such as smartphones or laptop computers. These conventional rechargeable lithium-ion batteries are in particular distinguished by the use of organic solvent-based liquid electrolytes. However, the latter are inflammable and lead to safety concerns regarding the use of the cited lithium-ion batteries. One way of avoiding organic electrolytes is to use solid electrolytes. However, such a solid electrolyte has a conductivity that is usually clearly smaller, i.e. by several orders of magnitude, than that of a corresponding liquid electrolyte. In order to obtain acceptable conductivities and to be able to utilize the advantages of a rechargeable lithium-ion battery, such solid-state batteries are nowadays especially produced in the form of so-called thin film batteries (TFB) or thin film storage elements which find their use in particular in mobile applications, for example in smart cards, in medical technology and sensor technology as well as in smartphones and other applications which require smart, miniaturized and possibly even flexible power sources.

2. Description of Related Art

An exemplary lithium-based thin film storage element has been described in US 2008/0001577 and basically consists of a substrate on which the electronically conductive collectors for the two electrodes are deposited in a first coating step. In the further manufacturing process, the cathode material is first deposited on the cathode collector, usually lithium cobalt oxide, LCO. In the next step, a solid electrolyte is deposited, which is usually an amorphous material including the substances lithium, oxygen, nitrogen, and phosphorus, and which is referred to as LiPON. In the next step, an anode material is deposited so as to be in contact with the substrate, the anode collector, and the solid electrolyte. In particular metallic lithium is used as the anode material. When the two collectors are connected in electrically conductive manner, lithium ions will migrate through the solid-state ion conductor from the anode to the cathode in the charged state, resulting in a current flow from the cathode to the anode through the electrically conductive connection of the two collectors. Vice versa, in the non-charged state migration of the ions from the cathode to the anode can be enforced by applying an external voltage, whereby the battery is charged.

A further thin film storage element is described in US 2001/0032666 A1, by way of example, and also comprises a substrate onto which different functional layers are deposited.

The layers deposited for such a thin film storage element usually have a thickness of about 20 µm or less, typically less than 10 µm or even less than 5 µm; a total thickness of the layer structure can be assumed to be 100 µm or less.

In the context of the present application, thin film storage elements refer to rechargeable lithium-based thin film storage elements and supercaps, by way of example; however the invention is not limited to these systems but may as well be used in other thin film storage elements, e.g. rechargeable and/or printed thin film cells.

A thin film storage element is generally manufactured using complex coating processes also including patterned deposition of the individual materials. Very complicated patterning of the exact thin film storage elements is possible, as can be seen from U.S. Pat. No. 7,494,742 B2, for example. In case of lithium-based thin film storage elements, particular difficulties are moreover encountered due to the use of metallic lithium as an anode material because of the high reactivity thereof. For example, metallic lithium has to be handled under preferably water-free conditions since otherwise it would react to form lithium hydroxide and the functionality as an anode would no longer be ensured. Accordingly, a lithium-based thin film storage element must also be protected against moisture by an encapsulation.

U.S. Pat. No. 7,494,742 B2 describes such an encapsulation for the protection of non-stable constituents of a thin film storage element, such as, e.g., lithium or certain lithium compounds. The encapsulation function is here provided by a coating or a system of different coatings which may fulfill further functions as part of the overall design of the battery.

In addition, as described for example in document US 2010/0104942, under the manufacturing conditions of a lithium-based thin film storage element, in particular during annealing or heat treatment steps which are necessary for the formation of crystal structures suitable for lithium intercalation, undesirable side reactions of the mobile lithium ions with the substrate will occur, since the lithium has a high mobility and can easily diffuse into common substrate materials.

A further issue with thin film storage elements relates to the substrate materials employed. The prior art describes a multiplicity of different substrate materials, such as, for example, silicon, mica, various metals, and ceramic materials. The use of glass is also often mentioned, but essentially without further details on the particular composition or precise properties thereof.

US 2001/0032666 A1 describes a capacitor-type energy storage which may for instance be a lithium-ion battery. Here, semiconductors are mentioned as substrate materials, inter alia.

U.S. Pat. No. 6,906,436 B2 describes a solid state battery in which metal foils, semiconductor materials or plastic films can be used as substrate materials, for example.

U.S. Pat. No. 6,906,436 B2 describes a variety of possibilities for optional substrate materials, for example metals or metal coatings, semiconducting materials or insulators such as sapphire, ceramics, or plastics. Different geometries of the substrate are possible.

In U.S. Pat. No. 7,494,742 B2, metals, semiconductors, silicates, and glass, as well as inorganic or organic polymers are described as substrate materials, inter alia.

U.S. Pat. No. 7,211,351 B2 mentions metals, semiconductors, or insulating materials and combinations thereof as substrates.

US 2008/0001577 A1 mentions semiconductors, metals, or plastic films as substrates.

EP 2434567 A2 mentions, as substrates, electrically conductive materials such as metals, insulating materials such as ceramics or plastics, and semiconducting materials such as, e.g., silicon, and combinations of semiconductors and conductors or more complex structures for adapting the thermal expansion coefficient. These or similar materials are also mentioned in documents US 2008/0032236 A1, U.S. Pat. No. 8,228,023 B2, and US 2010/0104942 A1.

By contrast, US 2010/0104942 A1 describes, as substrate materials that are relevant in practice, only substrates made of metals or metal alloys having a high melting point, and dielectric materials such as high quartz, silicon wafers, aluminum oxide, and the like. This is due to the fact that for producing a cathode from the usually employed lithium cobalt oxide (LCO), a temperature treatment at temperatures of more than 400° C. or even more than 500° C. is necessary in order to obtain a crystal structure that is particularly favorable for storing $Li^+$ ions in this material, so that materials such as polymers or inorganic materials with low softening points cannot be used. However, metals or metal alloys as well as dielectric materials have several shortcomings. For example, dielectric materials are usually brittle and cannot be used in cost-efficient roll-to-roll processes, while metals or metal alloys, on the other hand, tend to oxidize during a high-temperature treatment of the cathode material. In order to circumvent these difficulties, US 2010/0104942 A1 proposes a substrate made of different metals or silicon, wherein the redox potentials of the combined materials are adapted to each other so that controlled oxide formation occurs.

Also widely discussed is how to circumvent the high temperature resistance of the substrate as required in the aforementioned US 2010/0104942 A1, for example. By adapting process conditions, for example, substrates with a temperature resistance of 450° C. or below can be used. However, prerequisites for this are deposition processes in which the substrate is heated and/or the sputtering gas mixture of $O_2$ and Ar is optimized and/or a bias voltage is applied and/or a second sputtering plasma is applied in the vicinity of the substrate. This is discussed, for example, in US 2014/0030449 A1, in Tintignac et al., Journal of Power Sources 245 (2014), 76-82, or else in Ensling, D., Photoelectron spectroscopy examination of the electronic structure of thin lithium cobalt oxide layers, dissertation, Technische Universität Darmstadt, 2006. In general, however, such process engineering adaptations are expensive and, depending on the processing, are hardly implementable in a cost-effective manner, especially if inline coating of wafers is envisaged.

US 2012/0040211 A1 describes, as a substrate, a glass film with a thickness of at most 300 µm and a surface roughness of not more than 100 Å. This low surface roughness is required because the layers of a thin film storage element generally have very low thicknesses. Even small unevenness of the surface may have a critical adverse effect on the functional layers of the thin film storage element and may thus result in failure of the battery as a whole.

The same applies to document WO 2014/062676 A1 which discloses thin film batteries using borosilicate glass or soda-lime glass. No information about thickness variations of the substrate is given there.

Thus, shortcomings of the prior art particularly exist in the area of substrate and/or superstrate materials of electrical storage elements, in particular lithium-based thin film storage elements. This is due to the aggressiveness of the functional materials used for such storage elements. For example, these functional materials necessarily have high redox potentials, especially in the charged state, and are therefore latently instable. If these redox potentials are not reduced in a controlled manner during the use of such a storage element in a discharging process, a reaction of the functional materials with other, even otherwise inert components of the storage element may occur, for example with a substrate on which functional layers have been deposited.

As described in US 2010/0104942 A1, for example, a drawback of lithium as a component of an electrical storage element, in particular of a lithium-based rechargeable battery, is its high mobility, so that under the manufacturing and also the operating conditions of a lithium-based electrical storage system diffusion of the lithium may occur, for example into a substrate or into a superstrate which is in contact with a lithium-containing material. This not only results in depletion of active material in the storage system and thus in a loss in storage capacity, since the diffused lithium is no longer available for the actual charging and discharging reactions, but may also lead to a degradation of the substrate or superstrate material due to undesirable side reactions.

SUMMARY

An object of the invention is to provide an electrical storage element which is improved in terms of durability and flexibility of design.

Advantageously, the invention can provide a sheet-like discrete element for use in an electrical storage system, which is chemically reactive to a reduced degree, inert, and/or permeable to a reduced degree, and/or impermeable with respect to functional materials of the electrical storage element.

In the context of the present application a shaped body is considered as being sheet-like if the dimension of the element in one spatial direction is smaller by at least half an order of magnitude than in the two other spatial directions. In the context of the present application a shaped body is considered as being discrete if it is separable as such from the electrical storage system under consideration, that is to say it may in particular as well be provided alone.

The object of the invention comprises the provision of an electrical storage system that includes a sheet-like discrete element, the sheet-like discrete element, and its manufacturing and use.

A further object of the present invention is to provide an electrical storage element, in particular a thin film storage element which mitigates the shortcomings of the current prior art and provides for cost-effective manufacturing of thin film storage elements. Another object of the invention is to provide a sheet-like discrete element for use in an electrical storage element as well as its manufacturing and use.

The sheet-like discrete element is intended to mitigate the shortcomings of the prior art and should provide sufficient stability against contamination by battery components, combined with a sufficient thermal stability of >300° C., preferably >400° C. Furthermore, a high barrier effect against moisture and an optical transmission adapted to the production processes and the needs of the respective specific cell design or a blocking effect against UV radiation are advantageous. If the sheet-like discrete element is used as a substrate in an electrical storage system, it must moreover contribute to good adhesion of applied layers, that means it should in particular have an expansion coefficient appropriate with respect to the deposition of the adjacent layer, i.e. usually the LCO.

The object of the invention can be achieved in a surprisingly simple way by incorporating into an electrical storage element a sheet-like discrete element which has, on at least one face thereof, a surface that is designed so as to be chemically reactive to a reduced degree, inert, and/or permeable to a reduced degree, and/or impermeable with respect to materials applied on this surface.

In a further embodiment, this at least one surface is designed as a barrier layer against the diffusion of metals.

In a further embodiment, this at least one surface is designed as a barrier layer against alkali and/or alkaline earth ions.

This metal is preferably lithium.

In a further embodiment, the barrier layer is defined by a vertically structured variation of the composition of the surface in such a manner that no direct diffusion paths into the bulk of the sheet-like discrete element are possible.

In a further embodiment, the vertically structured surface zone includes atoms which effectively getter the detrimental metals.

In a further embodiment, the vertically structured variation of composition of the surface is defined by a sequence of layers, wherein at least two adjacent layers have a different composition, and wherein the composition of the layers and of the sheet-like element are different.

In a preferred embodiment of the invention, the vertically structured variation of composition is achieved by a coating of the sheet-like element, preferably by using a plasma-assisted coating process.

In a further embodiment of the invention, the employed coating process is a PECVD process, atomic layer deposition (ALD), or pulsed magnetron sputtering.

The barrier layer of the invention which is preferably deposited using one of the abovementioned coating processes is distinguished by being amorphous, at least X-ray amorphous.

The coating according to the invention is an oxide, a nitride, and/or a carbide and further comprises at least one of the elements Si, Al, Cr, Ta, Zr, Hf, and/or Ti.

Depending on the coating process or the process parameters used, the barrier effect of the layer might not yet be optimally pronounced directly after generation of the layer. For example in the case of deposition using a sputtering process on a cold substrate or sputtering with low target power density or with high sputtering rates it can be assumed that an imperfect layer will grow in the mold. For example, non-optimal process parameters may result in a columnar growth and thus in predestined diffusion channels. Generally, due to defects, the density of the growing layer may be less than the density of perfect material. Obviously, diffusion through the less dense material is easier than diffusion through a denser material. In CVD processes, one or more precursors in gaseous state are brought into contact with the substrate. By supplying energy through temperature or in the form of a plasma, the precursor is converted to form the desired layer material while other gaseous products are generated. Here too, not perfectly dense layers might be produced if the process parameters are not optimally selected.

In general, a heat treatment step (also known as annealing) promotes subsequent compacting of non-optimal layers, and as a result thereof an improvement in the barrier property is detectable. In primary literature, "Applied Surface Science 244 (2005) 61-64", this has been impressively described for Si nitride films produced by CVD. Thermal treatment of the layer at 800° C. for 30 minutes is sufficient to prevent diffusion of lithium, while in the non-annealed case the same layer is permeable to lithium.

Such a separate annealing step is time-consuming and naturally expensive. Surprisingly, it has been found that the separate annealing of the barrier layer can be dispensed with because the enhancement of the barrier effect can be achieved in a process step together with the annealing of the LCO layer (necessary for converting the LCO into the crystallographically preferred high-temperature (HT) phase).

However, the barrier layer does not only protect the substrate from components of the thin film battery. Vice versa, the barrier can also prevent components of the glass from entering into the components of the battery during the annealing step or during use. Depending on the substrate material used for the sheet-like discrete element, e.g. alkali and/or alkaline earth elements are known as elements that are mobile and tend to diffuse.

Furthermore, the sheet-like discrete element is distinguished by a total thickness variation (ttv) in a range of <25 µm, preferably of <15 µm, more preferably of <10 µm, and most preferably of <5 µm based on the wafer or substrate size used, based on wafer or substrate sizes in a range of >100 mm in diameter, in particular with a lateral dimension of 100 mm×100 mm, preferably based on wafer or substrate sizes in a range of >200 mm in diameter, in particular with a lateral dimension of 200 mm×200 mm, and more preferably based on wafer or substrate sizes in a range of >400 mm in diameter, in particular with a lateral dimension of 400 mm×400 mm. Thus, the indication typically refers to wafer or substrate sizes in a range of >100 mm in diameter or a size of 100 mm×100 mm, preferably >200 mm in diameter or a size of 200 mm×200 mm, and more preferably >400 mm in diameter or a size of 400 mm×400 mm.

Furthermore, it is also advantageous if the sheet-like discrete element is selectively adjustable with respect to its properties in the UV range, i.e. absorption and transmission, as a function of precisely selected compositions, since in this way inexpensive processes that use UV light may be employed for producing a thin film storage element, for example for curing organic constituents of an electrical storage element using UV light or using excimer lasers.

The substrate material for the sheet-like discrete element according to the invention preferably has a transmittance, in a range from 200 nm to 270 nm, in particular in case of a thickness of 30 µm, of 0.1% or more, and/or a transmittance of more than 0.5% in particular preferably at 222 nm, of more than 0.3% in particular preferably at 248 nm, of more than 3% in particular preferably at 282 nm, of more than 50% in particular preferably at 308 nm, and of more than 88% in particular preferably at 351 nm, and in the range from 200 nm to 270 nm in particular in case of a thickness of 100 µm of 0.1% or more, and/or a transmittance of more than 0.5% in particular preferably at 222 nm, of more than 0.3% in particular preferably at 248 nm, of more than 0.1% in particular preferably at 282 nm, of more than 30% in particular preferably at 308 nm, and of more than 88% in particular preferably at 351 nm.

For a sheet-like discrete element of the invention, the transmittance values of the substrate material are reduced due to the barrier layer by less than 60%, preferably by less than 30%, and more preferably by less than 10%.

The sheet-like discrete element according to the invention has a thickness of not more than 2 mm, preferably less than 1 mm, more preferably less than 500 µm, and yet more preferably of less than or equal to 200 µm. Most preferred is a thickness of not more than 100 µm.

In one embodiment of the invention, the sheet-like discrete element exhibits a water vapor transmission rate (WVTR) of $<10^{-3}$ g/(m²·d), preferably of $<10^{-5}$ g/(m²·d), and most preferably of $<10^{-6}$ g/(m²·d).

In a further embodiment, the sheet-like discrete element has a specific electrical resistance at a temperature of 350° C. and at an alternating current with a frequency of 50 Hz of greater than $1.0*10^6$ Ohm·cm.

The sheet-like discrete element is furthermore characterized by a maximum temperature resistance of at least 300° C., preferably at least 400° C., most preferably at least 500° C., and by a coefficient of linear thermal expansion α in a range from $2.0*10^{-6}$/K to $10*10^{-6}$/K, preferably from $2.5*10^{-6}$/K to $9.5*10^{-6}$/K, and most preferably from $3.0*10^{-6}$/K to $9.5*10^{-6}$/K. It has been found that particularly good layer qualities can be achieved in a thin film storage element when the following relationship applies to the maximum load temperature $\theta_{Max}$, in ° C., and the coefficient of linear thermal expansion α: $600 \cdot 10^{-6} \leq \theta_{Max} \cdot \alpha \leq 8000 \cdot 10^{-6}$, particularly preferably $800 \cdot 10^{-6} \leq \theta_{Max} \cdot \alpha \leq 5000 \cdot 10^{-6}$.

Here, unless otherwise stated, the linear coefficient of thermal expansion α is given for a range from 20 to 300° C. The notations α and $\alpha_{(20-300)}$ are used synonymously in the context of the present application. The given value is the nominal coefficient of mean linear thermal expansion according to ISO 7991, which is determined in static measurement.

In the context of the present application, the maximum load temperature $\theta_{Max}$ is considered as a temperature at which the functional integrity of the material is still fully ensured and at which decomposition and/or degradation reactions of the material have not yet started. Naturally this temperature is defined differently depending on the material used. For oxidic crystalline materials, the maximum load temperature is usually given by the melting point; for glasses usually the glass transition temperature $T_g$ is assumed, however, for organic glasses the decomposition temperature may even be below $T_g$; and for metals or metal alloys the maximum load temperature can be approximately indicated by the melting point, unless the metal or the metal alloy reacts in a degradation reaction below the melting point.

The transformation temperature $T_g$ is defined by the point of intersection of the tangents to the two branches of the expansion curve during a measurement with a heating rate of 5 K/min. This corresponds to a measurement according to ISO 7884-8 or DIN 52324, respectively.

The substrate material for the sheet-like element of the invention is composed of at least one oxide or a mixture or compound of oxides.

In a further embodiment of the invention, this at least one oxide is $SiO_2$.

In a further embodiment of the invention, the substrate for the sheet-like discrete element according to the invention is provided in the form of a glass. Within the context of the present application, the term 'glass' refers to a material which is essentially inorganic in nature and predominantly consists of compounds of metals and/or semimetals with elements of groups VA, VIA, and VIIA of the periodic table of elements, but preferably with oxygen, and which is distinguished by an amorphous state, i.e. a three-dimensional state without periodical order, and by a specific electrical resistance of greater than $1.0*10^6$ Ohm·cm at a temperature of 350° C. and at an alternating current of a frequency of 50 Hz. Hence, in particular the amorphous material LiPON which is used as a solid-state ion conductor is not considered to be a glass in the sense of the present application.

According to a further embodiment of the invention, the substrate material for the sheet-like discrete element is obtained by a melting process.

Preferably, the substrate material for the sheet-like discrete element is formed into a sheet-like shape in a shaping process following the melting process. This shaping may be performed directly following the melting (known as hot forming). However, it is as well possible that first a solid, essentially non-shaped body is obtained which is transformed into a sheet-like state in a further step, by reheating and mechanical reshaping.

If the shaping of the substrate material for the sheet-like discrete element is accomplished by a hot forming process, this will, according to one embodiment of the invention, involve drawing processes, for example down-draw, up-draw, or overflow fusion processes. However, other hot forming processes are also possible, for example shaping in a float process.

The following examples 1 to 22 give exemplary compositions for a substrate material of a sheet-like discrete element according to the invention. Exemplary embodiment 23 describes a coating process for producing a sheet-like discrete element according to the invention.

EXEMPLARY EMBODIMENT 1

The composition of the sheet-like discrete element is given, by way of example, by the following composition, in wt %:

| | |
|---|---|
| $SiO_2$ | 30 to 85 |
| $B_2O_3$ | 3 to 20 |
| $Al_2O_3$ | 0 to 15 |
| $Na_2O$ | 3 to 15 |
| $K_2O$ | 3 to 15 |
| ZnO | 0 to 12 |
| $TiO_2$ | 0.5 to 10 |
| CaO | 0 to 0.1. |

EXEMPLARY EMBODIMENT 2

The composition of the sheet-like discrete element is furthermore given, by way of example, by the following composition, in wt %:

| | |
|---|---|
| $SiO_2$ | 58 to 65 |
| $B_2O_3$ | 6 to 10.5 |
| $Al_2O_3$ | 14 to 25 |
| MgO | 0 to 3 |
| CaO | 0 to 9 |
| BaO | 0 to 8, preferably 3-8 |
| ZnO | 0 to 2, | wherein a total of the amounts of MgO, CaO, and BaO is in a range from 8 to 18 wt %.

EXEMPLARY EMBODIMENT 3

The composition of the sheet-like discrete element is furthermore given, by way of example, by the following composition, in wt %:

| | |
|---|---|
| $SiO_2$ | 55 to 75 |
| $Na_2O$ | 0 to 15 |
| $K_2O$ | 0 to 14 |
| $Al_2O_3$ | 0 to 15 |
| MgO | 0 to 4 |
| CaO | 3 to 12 |
| BaO | 0 to 15 |
| ZnO | 0 to 5 |
| $TiO_2$ | 0 to 2. |

EXEMPLARY EMBODIMENT 4

A possible sheet-like discrete element is furthermore given, by way of example, by the following composition, in wt %:

| | |
|---|---|
| $SiO_2$ | 61 |
| $B_2O_3$ | 10 |
| $Al_2O_3$ | 18 |
| MgO | 2.8 |
| CaO | 4.8 |
| BaO | 3.3. |

With this composition, the following properties of the sheet-like discrete element are obtained:

| | |
|---|---|
| $\alpha_{(20-300)}$ | $3.2 \cdot 10^{-6}$/K; |
| $T_g$ | 717° C.; and |
| Density | 2.43 g/cm$^3$. |

EXEMPLARY EMBODIMENT 5

Another sheet-like discrete element is given, by way of example, by the following composition, in wt %:

| | |
|---|---|
| $SiO_2$ | 64.0 |
| $B_2O_3$ | 8.3 |
| $Al_2O_3$ | 4.0 |
| $Na_2O$ | 6.5 |
| $K_2O$ | 7.0 |
| ZnO | 5.5 |
| $TiO_2$ | 4.0 |
| $Sb_2O_3$ | 0.6 |
| $Cl^-$ | 0.1. |

With this composition, the following properties of the sheet-like discrete element are obtained:

| | |
|---|---|
| $\alpha_{(20-300)}$ | $7.2 \cdot 10^{-6}$/K; |
| $T_g$ | 557° C.; and |
| Density | 2.5 g/cm$^3$. |

EXEMPLARY EMBODIMENT 6

Another sheet-like discrete element is given, by way of example, by the following composition, in wt %:

| | |
|---|---|
| $SiO_2$ | 69 +/− 5 |
| $Na_2O$ | 8 +/− 2 |
| $K_2O$ | 8 +/− 2 |
| CaO | 7 +/− 2 |
| BaO | 2 +/− 2 |
| ZnO | 4 +/− 2 |
| $TiO_2$ | 1 +/− 1. |

With this composition, the following properties of the sheet-like discrete element are obtained:

| | |
|---|---|
| $\alpha_{(20-300)}$ | $9.4 \cdot 10^{-6}$/K; |
| $T_g$ | 533° C.; and |
| Density | 2.55 g/cm$^3$. |

EXEMPLARY EMBODIMENT 7

Yet another sheet-like discrete element is given, by way of example, by the following composition, in wt %:

| | |
|---|---|
| $SiO_2$ | 80 +/− 5 |
| $B_2O_3$ | 13 +/− 5 |
| $Al_2O_3$ | 2.5 +/− 2 |
| $Na_2O$ | 3.5 +/− 2 |
| $K_2O$ | 1 +/− 1. |

With this composition, the following properties of the sheet-like discrete element are obtained:

| | |
|---|---|
| $\alpha_{(20-300)}$ | $3.25 \cdot 10^{-6}$/K; |
| $T_g$ | 525° C.; and |
| Density | 2.2 g/cm$^3$. |

EXEMPLARY EMBODIMENT 8

Yet another sheet-like discrete element is given, by way of example, by the following composition, in wt %:

| | |
|---|---|
| $SiO_2$ | 62.3 |
| $Al_2O_3$ | 16.7 |
| $Na_2O$ | 11.8 |
| $K_2O$ | 3.8 |
| MgO | 3.7 |
| $ZrO_2$ | 0.1 |
| $CeO_2$ | 0.1 |
| $TiO_2$ | 0.8 |
| $As_2O_3$ | 0.7. |

With this composition, the following properties of the sheet-like discrete element are obtained:

| | |
|---|---|
| $\alpha_{(20-300)}$ | $8.6 \cdot 10^{-6}$/K; |
| $T_g$ | 607° C.; and |
| Density | 2.4 g/cm$^3$. |

EXEMPLARY EMBODIMENT 9

Yet another sheet-like discrete element is given, by way of example, by the following composition, in wt %:

| | |
|---|---|
| $SiO_2$ | 62.2 |
| $Al_2O_3$ | 18.1 |
| $B_2O_3$ | 0.2 |
| $P_2O_5$ | 0.1 |
| $Li_2O$ | 5.2 |
| $Na_2O$ | 9.7 |
| $K_2O$ | 0.1 |
| CaO | 0.6 |
| SrO | 0.1 |
| ZnO | 0.1 |
| $ZrO_2$ | 3.6. |

With this composition, the following properties of the sheet-like discrete element are obtained:

| | |
|---|---|
| $\alpha_{(20-300)}$ | $8.5 \cdot 10^{-6}$/K; |
| $T_g$ | 505° C.; and |
| Density | 2.5 g/cm$^3$. |

EXEMPLARY EMBODIMENT 10

Yet another sheet-like discrete element is given, by way of example, by the following composition, in wt %:

| | |
|---|---|
| $SiO_2$ | 52 |
| $Al_2O_3$ | 17 |
| $Na_2O$ | 12 |
| $K_2O$ | 4 |
| MgO | 4 |
| CaO | 6 |
| ZnO | 3.5 |
| $ZrO_2$ | 1.5. |

With this composition, the following properties of the sheet-like discrete element are obtained:

| | |
|---|---|
| $\alpha_{(20-300)}$ | $9.7 \cdot 10^{-6}$/K |
| $T_g$ | 556° C. |
| Density | 2.6 g/cm$^3$. |

EXEMPLARY EMBODIMENT 11

Yet another sheet-like discrete element is given, by way of example, by the following composition, in wt %:

| | |
|---|---|
| $SiO_2$ | 62 |
| $Al_2O_3$ | 17 |
| $Na_2O$ | 13 |
| $K_2O$ | 3.5 |
| MgO | 3.5 |
| CaO | 0.3 |
| $SnO_2$ | 0.1 |
| $TiO_2$ | 0.6. |

With this composition, the following properties of the sheet-like discrete element are obtained:

| | |
|---|---|
| $\alpha_{(20-300)}$ | $8.3 \cdot 10^{-6}$/K; |
| $T_g$ | 623° C.; and |
| Density | 2.4 g/cm$^3$. |

EXEMPLARY EMBODIMENT 12

Yet another sheet-like discrete element is given, by way of example, by the following composition, in wt %:

| | |
|---|---|
| $SiO_2$ | 61.1 |
| $Al_2O_3$ | 19.6 |
| $B_2O_3$ | 4.5 |
| $Na_2O$ | 12.1 |
| $K_2O$ | 0.9 |
| MgO | 1.2 |
| CaO | 0.1 |
| $SnO_2$ | 0.2 |
| $CeO_2$ | 0.3. |

With this composition, the following properties of the sheet-like discrete element are obtained:

| | |
|---|---|
| $\alpha_{(20-300)}$ | $8.9 \cdot 10^{-6}$/K; |
| $T_g$ | 600° C.; and |
| Density | 2.4 g/cm$^3$. |

EXEMPLARY EMBODIMENT 13

Yet another sheet-like discrete element is given, by way of example, by the following composition, in wt %:

| | |
|---|---|
| $SiO_2$ | 50 to 65 |
| $Al_2O_3$ | 15 to 20 |
| $B_2O_3$ | 0 to 6 |
| $Li_2O$ | 0 to 6 |
| $Na_2O$ | 8 to 15 |
| $K_2O$ | 0 to 5 |
| MgO | 0 to 5 |
| CaO | 0 to 7, preferably 0 to 1 |
| ZnO | 0 to 4, preferably 0 to 1 |
| $ZrO_2$ | 0 to 4 |
| $TiO_2$ | 0 to 1, preferably substantially free of $TiO_2$. |

Furthermore, the glass may include: from 0 to 1 wt %: $P_2O_5$, SrO, BaO; and from 0 to 1 wt % of refining agents: $SnO_2$, $CeO_2$, or $As_2O_3$, or other refining agents.

EXEMPLARY EMBODIMENT 14

Yet another sheet-like discrete element is given, by way of example, by the following composition, in wt %:

| | |
|---|---|
| $SiO_2$ | 58 to 65 |
| $B_2O_3$ | 6 to 10.5 |
| $Al_2O_3$ | 14 to 25 |
| MgO | 0 to 5 |
| CaO | 0 to 9 |
| BaO | 0 to 8 |
| SrO | 0 to 8 |
| ZnO | 0 to 2. |

EXEMPLARY EMBODIMENT 15

Yet another sheet-like discrete element is given, by way of example, by the following composition, in wt %:

| | |
|---|---|
| SiO$_2$ | 59.7 |
| Al$_2$O$_3$ | 17.1 |
| B$_2$O$_3$ | 7.8 |
| MgO | 3.4 |
| CaO | 4.2 |
| SrO | 7.7 |
| BaO | 0.1. |

With this composition, the following properties of the sheet-like discrete element are obtained:

| | |
|---|---|
| $\alpha_{(20\text{-}300)}$ | $3.8 \cdot 10^{-6}$/K; |
| T$_g$ | 719° C.; and |
| Density | 2.51 g/cm$^3$. |

EXEMPLARY EMBODIMENT 16

Yet another sheet-like discrete element is given, by way of example, by the following composition, in wt %:

| | |
|---|---|
| SiO$_2$ | 59.6 |
| Al$_2$O$_3$ | 15.1 |
| B$_2$O$_3$ | 9.7 |
| CaO | 5.4 |
| SrO | 6.0 |
| BaO | 2.3 |
| ZnO | 0.5 |
| Sb$_2$O$_3$ | 0.4 |
| As$_2$O$_3$ | 0.7. |

With this composition, the following properties of the sheet-like discrete element are obtained:

| | |
|---|---|
| $\alpha_{(20\text{-}300)}$ | $3.8 \cdot 10^{-6}$/K; and |
| Density | 2.5 g/cm$^3$. |

EXEMPLARY EMBODIMENT 17

Yet another sheet-like discrete element is given, by way of example, by the following composition, in wt %:

| | |
|---|---|
| SiO$_2$ | 58.8 |
| Al$_2$O$_3$ | 14.6 |
| B$_2$O$_3$ | 10.3 |
| MgO | 1.2 |
| CaO | 4.7 |
| SrO | 3.8 |
| BaO | 5.7 |
| Sb$_2$O$_3$ | 0.2 |
| As$_2$O$_3$ | 0.7. |

With this composition, the following properties of the sheet-like discrete element are obtained:

| | |
|---|---|
| $\alpha_{(20\text{-}300)}$ | $3.73 \cdot 10^{-6}$/K; |
| T$_g$ | 705° C.; and |
| Density | 2.49 g/cm$^3$. |

EXEMPLARY EMBODIMENT 18

Yet another sheet-like discrete element is given, by way of example, by the following composition, in wt %:

| | |
|---|---|
| SiO$_2$ | 62.5 |
| B$_2$O$_3$ | 10.3 |
| Al$_2$O$_3$ | 17.5 |
| MgO | 1.4 |
| CaO | 7.6 |
| SrO | 0.7. |

With this composition, the following properties of the sheet-like discrete element are obtained:

| | |
|---|---|
| $\alpha_{(20\text{-}300)}$ | 3.2 ppm/K |
| Density: | 2.38 g/cm$^3$. |

EXEMPLARY EMBODIMENT 19

Yet another sheet-like discrete element is given, by way of example, by the following composition, in wt %:

| | |
|---|---|
| SiO$_2$ | 55 to 75 |
| Na$_2$O | 0 to 15 |
| K$_2$O | 0 to 14 |
| Al$_2$O$_3$ | 0 to 15 |
| MgO | 0 to 4 |
| CaO | 3 to 12 |
| BaO | 0 to 15 |
| ZnO | 0 to 5. |

EXEMPLARY EMBODIMENT 20

Yet another sheet-like discrete element is given, by way of example, by the following composition, in wt %:

| | |
|---|---|
| SiO$_2$ | 74.3 |
| Na$_2$O | 13.2 |
| K$_2$O | 0.3 |
| Al$_2$O$_3$ | 1.3 |
| MgO | 0.2 |
| CaO | 10.7. |

With this composition, the following properties of the sheet-like discrete element are obtained:

| | |
|---|---|
| $\alpha_{(20\text{-}300)}$ | 9.0 ppm/K; and |
| T$_g$: | 573° C. |

EXEMPLARY EMBODIMENT 21

Yet another sheet-like discrete element is given, by way of example, by the following composition, in wt %:

| | |
|---|---|
| SiO$_2$ | 72.8 |
| Na$_2$O | 13.9 |
| K$_2$O | 0.1 |
| Al$_2$O$_3$ | 0.2 |
| MgO | 4.0 |
| CaO | 9.0. |

With this composition, the following properties of the sheet-like discrete element are obtained:

| | |
|---|---|
| $\alpha_{(20-300)}$ | 9.5 ppm/K |
| $T_g$: | 564° C. |

EXEMPLARY EMBODIMENT 22

Yet another sheet-like discrete element is given, by way of example, by the following composition, in wt %:

| | |
|---|---|
| $SiO_2$ | 60.7 |
| $Al_2O_3$ | 16.9 |
| $Na_2O$ | 12.2 |
| $K_2O$ | 4.1 |
| $MgO$ | 3.9 |
| $ZrO_2$ | 1.5 |
| $SnO_2$ | 0.4 |
| $CeO_2$ | 0.3. |

Unless not already listed, all the exemplary embodiments mentioned above may optionally contain refining agents from 0 to 1 wt %, for example $SnO_2$, $CeO_2$, $As_2O_3$, $Cl^-$, $F^-$, sulfates.

EXEMPLARY EMBODIMENT 23

In order to obtain a sheet-like discrete element according to the invention, a substrate material as mentioned in any of exemplary embodiments 1 to 8 is transferred through an air-lock into a sputtering system which is evacuated to a pressure of $<10^{-5}$ mbar. The substrate is heated to a temperature of at least 200° C. Process gas, typically argon, is introduced so that a process pressure of $<10^{-2}$ mbar is established. The sputtering system is equipped with Si-containing targets so that when using nitrogen as a reactive gas an $Si_3N_4$-containing material system can be deposited. A good barrier is produced by the sputtering process if the power density is above 10 W/cm$^2$. With the parameters mentioned, a layer having a thickness of 300 nm can be deposited, for example. Generally, the barrier layers may have a thickness between 10 nm and 1 µm. Thicknesses of the barrier layer between 80 and 200 nm are preferred, and a thickness of about 100 nm of the barrier layer is particularly preferred. Subsequently, the element is unloaded via an air-lock.

In order to examine the layers for a suitable barrier effect against lithium ions, the samples are introduced into liquid lithium nitrate ($LiNO_3$) for 10 minutes. The molten salt has a temperature of about 380° C. The samples are then removed and freed from dried salt residues. Once the samples have cooled, a depth profile can be acquired by a suitable analysis method, for example Time-of-Flight Secondary Ion Mass Spectroscopy (ToF-SIMS), which shows the profile of the $Li^+$ signal as a function of sputtering time and hence removal depth of the sample. ToF-SIMS is a very sensitive analysis method which is in particular capable of detecting lithium in very low concentrations. Exemplary results are shown in FIGS. 3 to 6.

Another method for testing the resistance of sheet-like discrete elements against lithium metal involves pressing a lithium metal strip onto the sheet-like discrete element. The lithium metal sample having a thickness of 100 µm and a surface area of 3 mm×3 mm was pressed onto samples of size 20 mm×20 mm in a glove box and then welded air-tightly and under vacuum. The samples were then placed in a press, and the lithium metal was pressed onto the sheet-like discrete element with a pressure of 1.5 bar for 1 minute to improve the contact between the two materials. The whole was stored for one week at room temperature. Thereafter, the lithium metal was removed from the sheet-like discrete element by reaction with distilled water, and the sheet-like discrete elements were examined for discoloration.

Table 1 gives an overview of some results which were obtained from sheet-like discrete elements according to the invention, for which different barrier coatings were applied to different substrates. The test included both the barrier effect against lithium ions in liquid $LiNO_3$ as described above, and the reaction after contact with metallic lithium as described above.

| Glass type | Glass thickness | Layer thickness | Barrier material | Technology | Appearance of the glass after contact with Li metal | Li signal of ToF-SIMS measurement (arb. units) after contact with $LiNO_3$ (liq) | Reduction of signal relative to non-coated reference by a factor of | Li signal within barrier |
|---|---|---|---|---|---|---|---|---|
| D263° | 100 µm | Non-coated | | reference | black | 5.0E+00 | | |
| | 100 µm | 60 nm | $Al_2O_3$ | ALD | transparent | 5.0E−01 | 10.0 | yes, constant |
| | 50 µm | 100 nm | $Si_3N_4$ | MF sputtering | transparent | 1.0E−03 | 5000.0 | no |
| | 50 µm | 100 nm | $SiO_2$ | MF sputtering | transparent | 2.0E+00 | 2.5 | yes, constant |
| | 100 µm | 100 nm | $Si_3N_4$ | PECVD | transparent | | | |
| | 100 µm | 100 nm | $Si_3N_4$ | PICVD | transparent | 1.0E−02 | 500.0 | yes, strongly decreasing |
| | 100 µm | 100 nm | $SiO_2$ | RF sputtering | transparent | | | |
| AF32° | 50 µm | 100 nm | $Si_3N_4$ | MF sputtering | | 1.0E−03 | 5000.0 | very low, detection limit |
| | 50 µm | 100 nm | $SiO_2$ | MF sputtering | | 3.0E−02 | 166.7 | yes, constant |
| | 100 µm | 100 nm | $Si_3N_4$ | PICVD | | 1.0E−02 | 500.0 | yes, constant |

DETAILED DESCRIPTION

Figure 1:
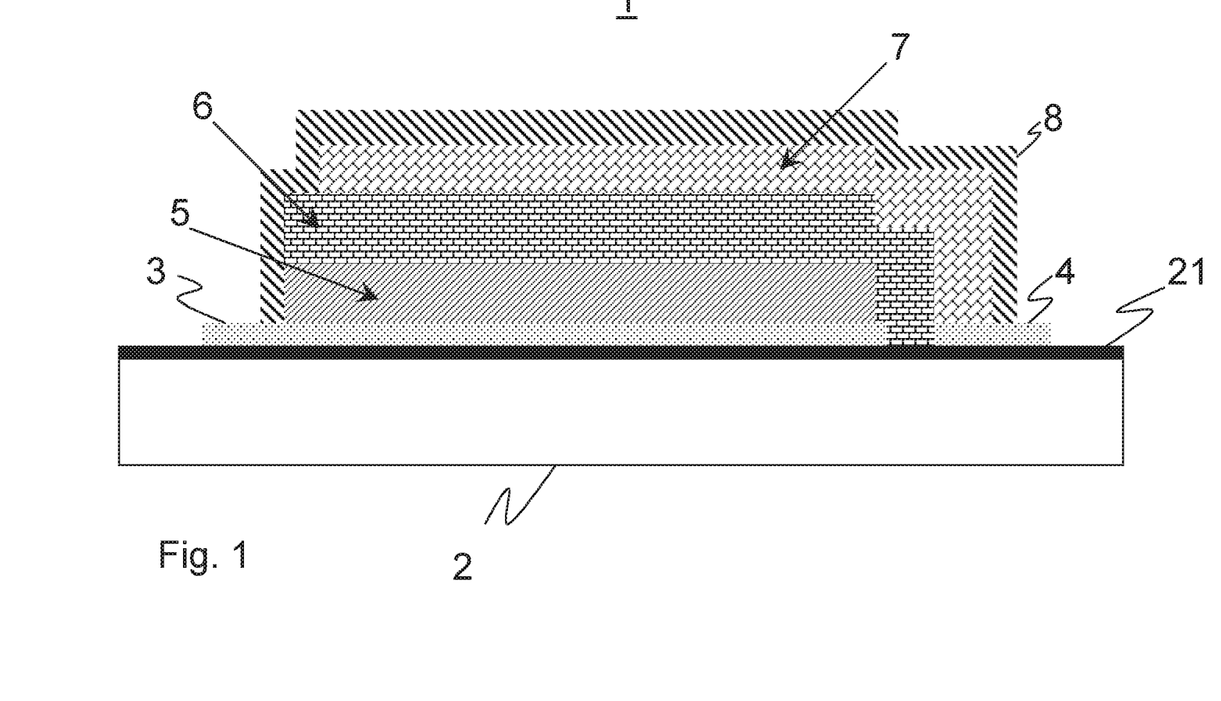
FIG. 1 schematically illustrates an electrical storage system which includes at least one sheet-like discrete element.

FIG. 1 schematically shows an electrical storage system 1 according to the present invention. It comprises a sheet-like discrete element 2 which is used as a substrate. Furthermore, a layer is applied to the substrate 2 which is designed as a diffusion barrier against metals, preferably against alkali and/or alkaline earth metals or ions of these metals. The coating 21 according to the invention is an oxide, nitride and/or a carbide and furthermore includes at least one of the elements Si, Al, Cr, Ta, Zr, Hf, and/or Ti. Furthermore, a sequence of different layers is applied on the substrate 2 or, more specifically, the barrier layer 21. By way of example and without being limited to the present example, first the two collector layers are applied on the sheet-like discrete element 2, cathode collector layer 3, and anode collector layer 4. Such collector layers usually have a thickness of a few micrometers and are made of a metal, for example of copper, aluminum, or titanium. Superimposed on collector layer 3 is cathode layer 5. If the electrical storage system 1 is a lithium-based thin film battery, the cathode is made of a lithium-transition metal compound, preferably an oxide, for example of $LiCoO_2$, of $LiMnO_2$, or else of $LiFePO_4$. Furthermore, the electrolyte 6 is applied on the substrate and is at least partially overlapping cathode layer 5. In the case of a lithium-based thin film battery, this electrolyte is mostly LiPON, a compound of lithium with oxygen, phosphorus, and nitrogen. Furthermore, the electrical storage system 1 comprises an anode 7 which may for instance be made of lithium titanium oxide or else of metallic lithium. Anode layer 7 is at least partially overlapping electrolyte layer 6 and collector layer 4. Furthermore, the electrical storage system 1 comprises an encapsulation layer 8.

In the context of the present invention, any material which prevents or greatly reduces the attack of fluids or other corrosive materials on the electrical storage system 1 is considered as an encapsulation or sealing of the electrical storage system 1.

Figure 2:
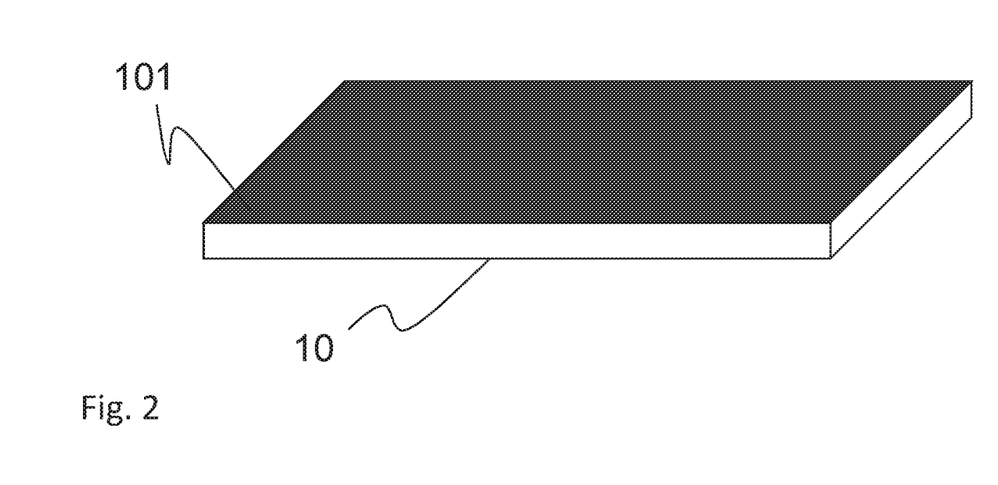
FIG. 2 schematically illustrates a sheet-like discrete element according to the invention.

FIG. 2 schematically illustrates a sheet-like discrete element according to the present invention, here in the form of a sheet-like shaped body 10. In the context of the present invention, a shaped body is referred to as being sheet-like or a sheet if its dimension in one spatial direction is not more than half of that in the two other spatial directions. A shaped body is referred to as a ribbon in the present invention if it has a length, width, and thickness for which the following relationship applies: the length is at least ten times larger than the width which in turn is at least twice as large as the thickness. Furthermore, a layer is applied on the sheet-like discrete element 10, which is designed as a diffusion barrier against metals, preferably against alkali and/or alkaline earth metals or ions of these metals. The coating 101 according to the invention is an oxide, a nitride, and/or a carbide and furthermore includes at least one of the elements Si, Al, Cr, Ta, Zr, Hf, and/or Ti.

Figure 3:
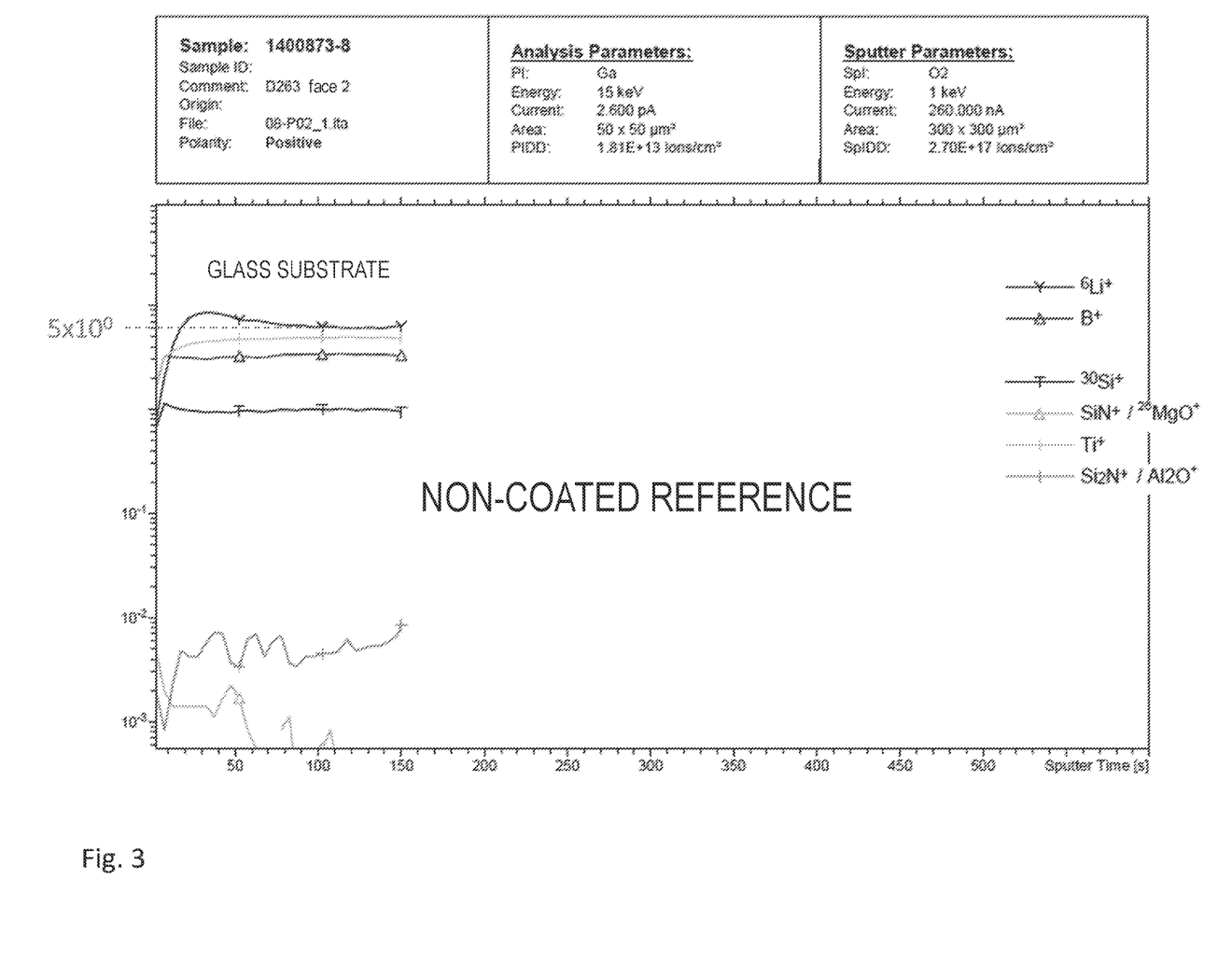
FIGS. 3 to 6 show ToF-SIMS spectra of different sheet-like discrete elements.

FIG. 3 shows the ToF-SIMS spectrum of a non-coated sheet-like discrete element, the sheet-like discrete element consisting of the glass D263®. The spectrum was obtained after the sample had been stored in liquid $LiNO_3$ for 10 minutes at 380° C. Lithium is clearly detectable, with a (dimensionless) signal of approximately $5*10^9$.

Figure 4:
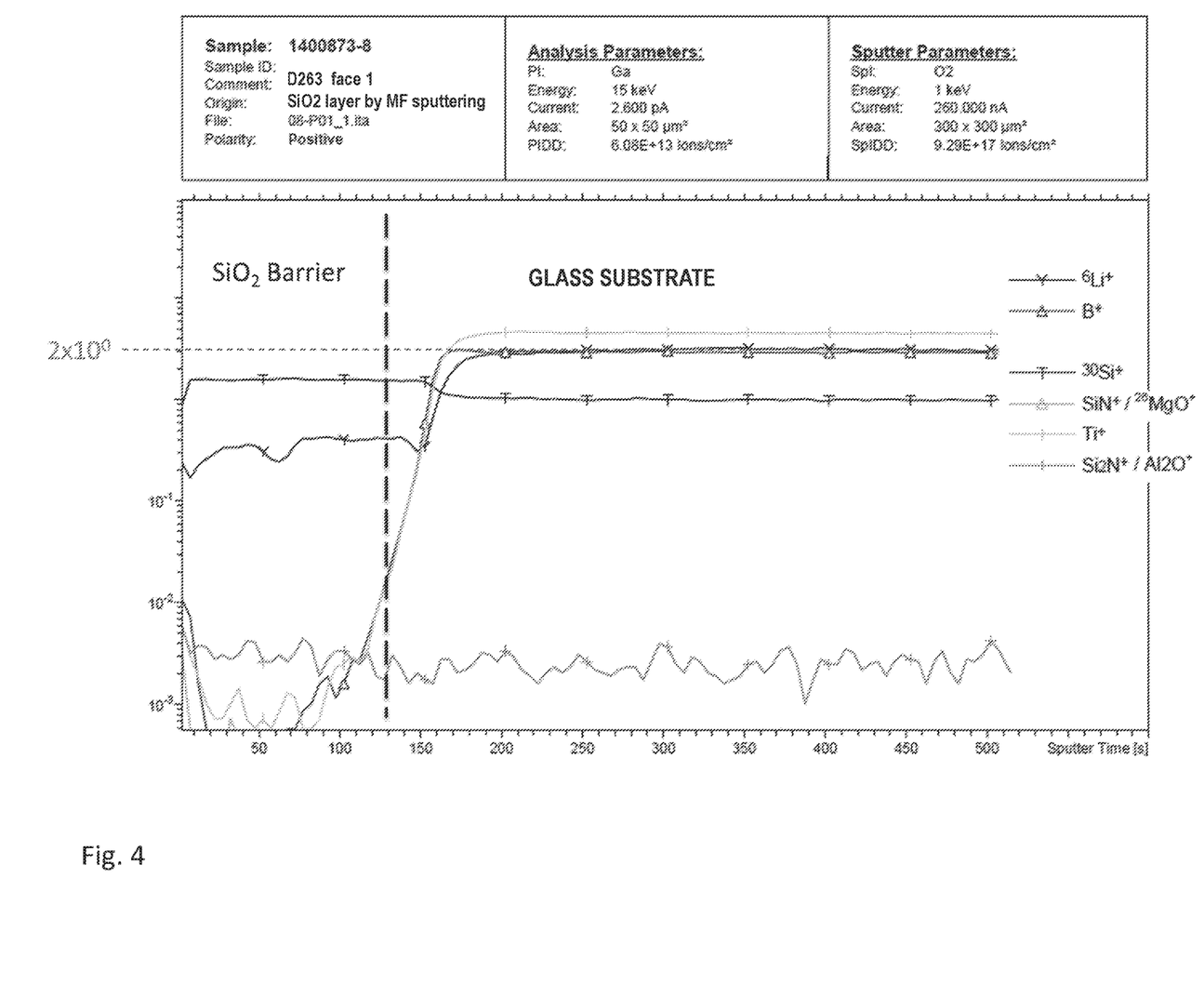

FIG. 4 shows a ToF-SIMS spectrum of a sheet-like discrete element, for which a substrate consisting of the glass D263® with an $SiO_2$ barrier layer of a layer thickness of approximately 100 nm obtained by magnetron sputtering (MF sputtering) was examined after having been stored in liquid $LiNO_3$. The spectrum was obtained after the sample had been stored in liquid $LiNO_3$ for 10 minutes at 380° C. Lithium is clearly detectable both in the $SiO_2$ layer and in the substrate material. Compared to the reference shown in FIG. 1, the level of the lithium signal in the substrate material has only been reduced to half. Thus, there is no sufficient barrier effect.

Figure 5:
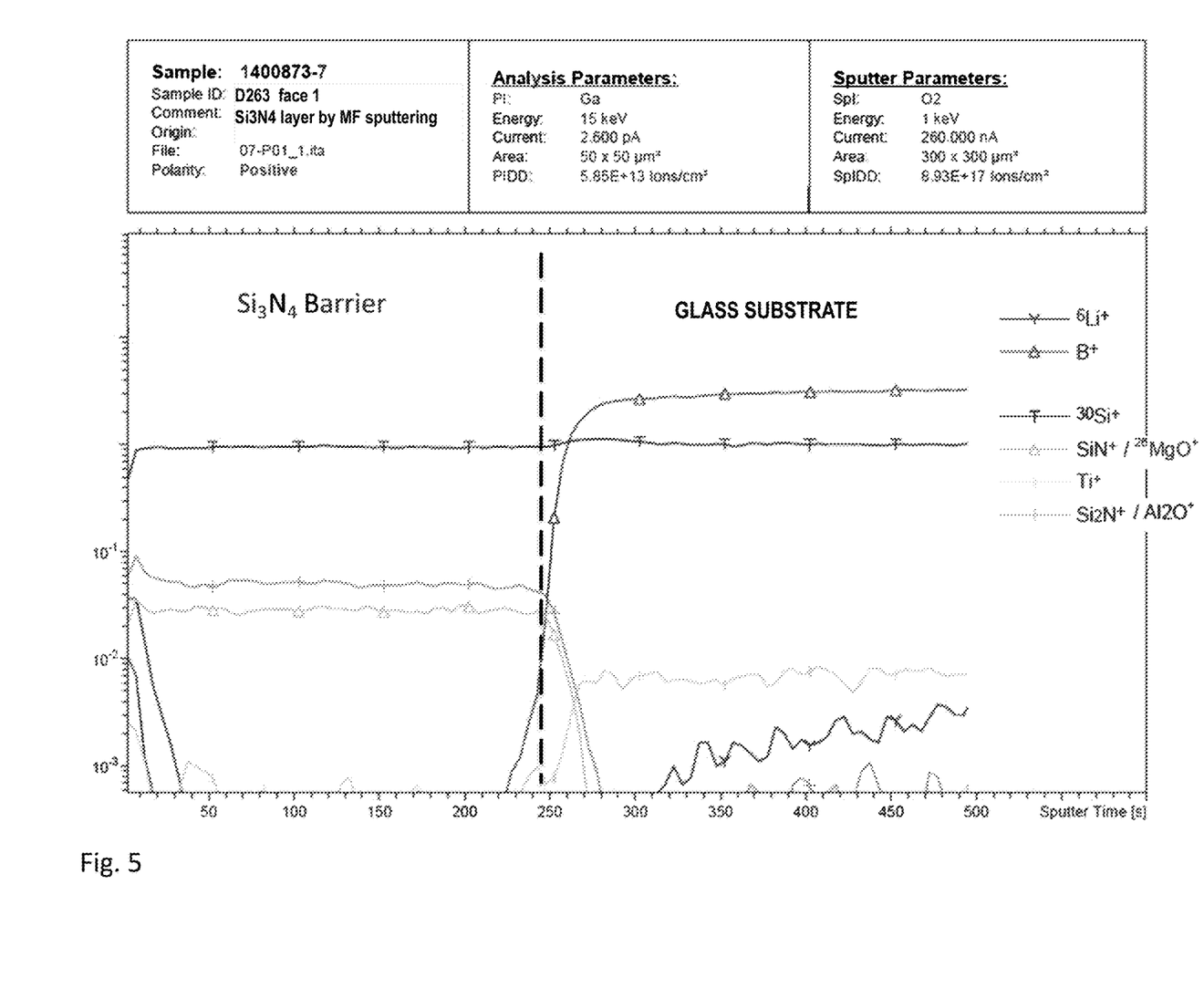

FIG. 5 shows the ToF-SIMS spectrum of a sheet-like discrete element, for which a substrate consisting of the glass D263® with an $Si_3N_4$ barrier layer of a layer thickness of approximately 100 nm obtained by magnetron sputtering (MF sputtering) was examined after having been stored in liquid $LiNO_3$. The spectrum was obtained after the sample had been stored in liquid $LiNO_3$ for 10 minutes at 380° C. Lithium is not detectable within the barrier layer. In the glass the signal is reduced by a factor of about 5000 compared to the reference shown in FIG. 1. This weak signal might as well indicate a contamination of the glass with lithium as a trace element. Thus, the coating shown here is a very good barrier against diffusion of lithium ions.

Figure 6:
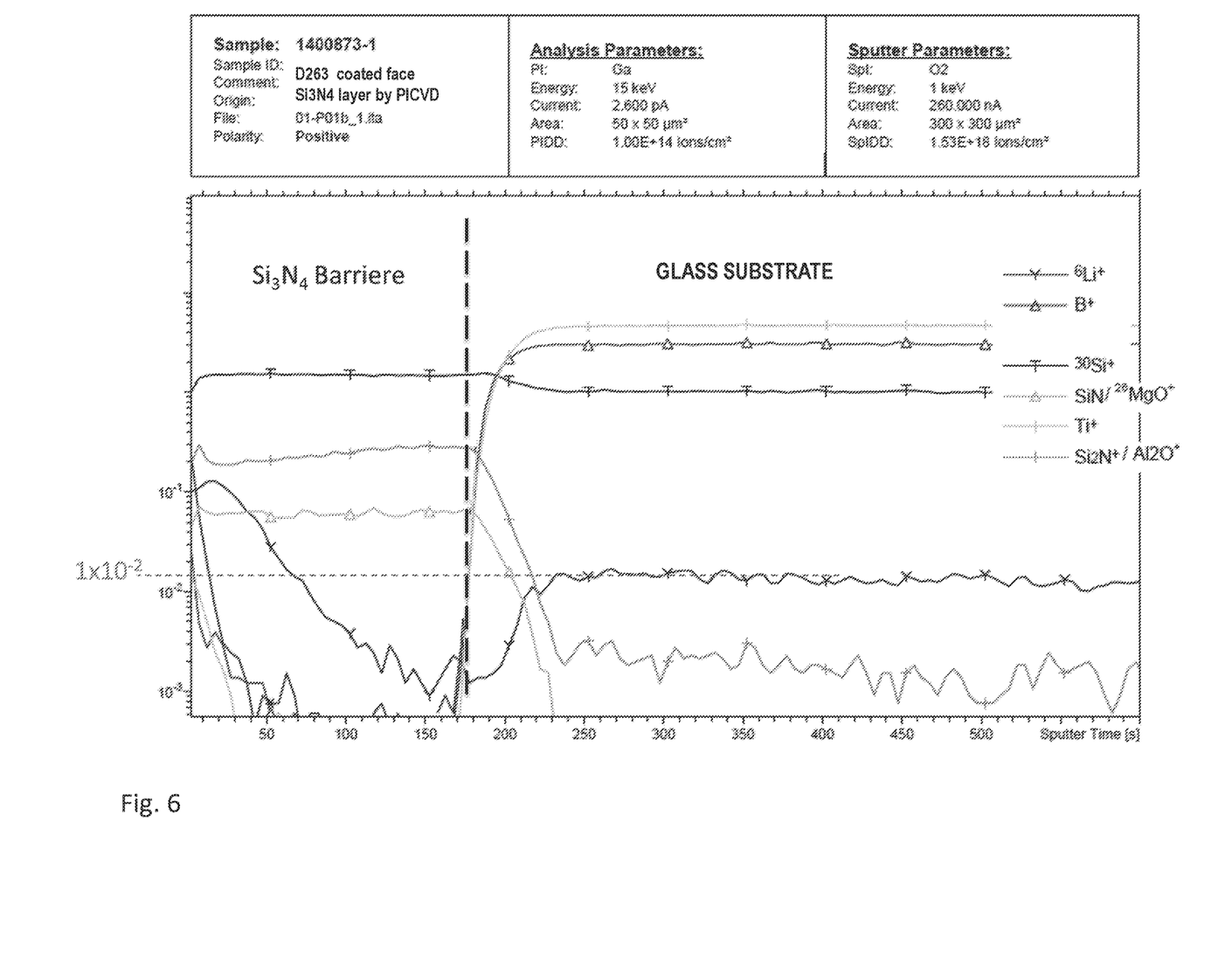

FIG. 6 shows the ToF-SIMS spectrum of a sheet-like discrete element, for which a substrate consisting of the glass D263® with an $Si_3N_4$ barrier layer having a layer thickness of approximately 100 nm obtained by Plasma Impulse Chemical Vapor Deposition (PICVD) was examined after having been stored in liquid $LiNO_3$. The spectrum was obtained after the sample had been stored in liquid $LiNO_3$ for 10 minutes at 380° C. Lithium is detectable in the barrier layer with a concentration decreasing towards the glass substrate. In the glass the signal is reduced by a factor of about 500 compared to the reference shown in FIG. 1. The barrier effect of the layer can be sufficient under certain circumstances.

LIST OF REFERENCE NUMERALS

1 Electrical storage system
2 Sheet-like discrete element used as a substrate
21 Diffusion barrier layer on substrate
3 Cathode collector layer
4 Anode collector layer
5 Cathode
6 Electrolyte
7 Anode
8 Encapsulation layer
10 Sheet-like discrete element in the form of a sheet-like shaped body
101 Diffusion barrier layer on sheet-like discrete element

What is claimed is:

1. An electrical storage system, comprising:
a thickness of less than 2 mm;
a sheet-like discrete element made of glass;
a barrier layer on a surface of the sheet-like discrete element, the barrier layer being permeable to a reduced degree with respect to lithium coming into contact with the surface, wherein the barrier layer comprises an element selected from the group consisting of a nitride of Si, oxide of Si, carbide of Si, nitride of Al, nitride of Cr, nitride of Ti, nitride of Zr, nitride of Hf, nitride of Ta, oxide of Al, oxide of Cr, oxide of Ti, oxide of Zr, oxide of Hf, oxide of Ta, and any combinations thereof, and
an anode, a cathode, and an electrolyte on the barrier layer, wherein the glass is selected from any of the following composition ranges, in wt %:

|  | No. 1 | No. 2 | No. 3 | No. 4 | No. 5 |
| --- | --- | --- | --- | --- | --- |
| $SiO_2$ | 30-85 | 58-65 | 64-74 | 75-85 | 50-65 |
| $B_2O_3$ | 3-20 | 6-10.5 |  | 8-18 | 0-6 |
| $Al_2O_3$ | 0-15 | 14-25 |  | 0.5-4.5 | 15-20 |
| $Li_2O$ |  |  |  |  | 0-6 |
| $Na_2O$ | 3-15 |  | 6-10 | 1.5-5.5 | 8-15 |
| $K_2O$ | 3-15 |  | 6-10 | 0-2 | 0-5 |
| MgO |  | 0-3 |  |  | 0-5 |
| CaO | 0-0.1 | 0-9 | 5-9 |  | 0-7 |

-continued

|  | No. 1 | No. 2 | No. 3 | No. 4 | No. 5 |
|---|---|---|---|---|---|
| BaO |  | 3-8 | 0-4 |  | 0-4 |
| ZnO | 0-12 | 0-2 | 2-6 |  | 0-4 |
| TiO$_2$ | 0.5-10 |  | 0-2 |  | 0-1 |
| ΣMgO + CaO + BaO |  | 8-18. |  |  |  |

2. The electrical storage system as claimed in claim 1, wherein the glass further comprises from 0 to 1 wt % of refining agents selected from the group consisting of SnO$_2$, CeO$_2$, As$_2$O$_3$, Cl$^-$, F$^-$, and sulfates.

3. The electrical storage system as claimed in claim 1, wherein the barrier layer comprises a vertical composition variation of the surface so as to provide no direct diffusion paths into the sheet-like discrete element.

4. The electrical storage system as claimed in claim 3, wherein the vertical composition variation comprises getter materials for alkali and/or alkaline earth metals.

5. The electrical storage system as claimed in claim 3, wherein the vertical composition variation comprises a sequence of at least adjacent layers having a different composition.

6. The electrical storage system as claimed in claim 1, wherein the barrier layer is a plasma-assisted coating or an atomic layer deposition (ALD) coating.

7. The electrical storage system as claimed in claim 1, wherein the barrier layer has a barrier effect initiated by a separate annealing step prior to application of a current conductor or the anode.

8. The electrical storage system as claimed in claim 1, wherein the barrier layer has a barrier effect initiated during annealing of the anode.

9. The electrical storage system as claimed in claim 1, wherein the sheet-like discrete element comprises a substrate having a transmittance selected from the group consisting of: 0.1% or more in a range from 200 nm to 270 nm at a thickness of 30 μm; more than 0.5% at 222 nm at a thickness of 30 μm; more than 0.3% at 248 nm at a thickness of 30 μm; more than 3% in at 282 nm at a thickness of 30 μm; more than 50% at 308 nm at a thickness of 30 μm; more than 88% at 351 nm at a thickness of 30 μm; 0.1% or more in a range from 200 nm to 270 nm at a thickness of 100 μm; more than 0.5% at 222 nm at a thickness of 100 μm; more than 0.3% at 248 nm at a thickness of 100 μm; more than 0.1% at 282 nm at a thickness of 100 μm;
more than 30% at 308 nm at a thickness of 100 μm; and more than 88% at 351 nm at a thickness of 100 μm.

10. The electrical storage system as claimed in claim 1, wherein the sheet-like discrete element has transmittance values that, due to the barrier layer, are reduced by less than 60%.

11. The electrical storage system as claimed in claim 1, wherein the barrier coating is amorphous.

12. The electrical storage system as claimed in claim 1, wherein the sheet-like discrete element has thickness variation of not more than 25 μm based on a wafer size in a range of >100 mm in diameter.

13. The electrical storage system as claimed in claim 1, wherein the sheet-like discrete element has a water vapor transmission rate (WVTR) of <10$^{-3}$g/(m$^2$·d).

14. The electrical storage system as claimed in claim 1, wherein the sheet-like discrete element has a thickness selected from the group consisting of less than 2 mm, less than 1 mm, less than 500 μm, less than or equal to 200 μm, and not more than 100 μm.

15. The electrical storage system as claimed in claim 1, wherein the sheet-like discrete element has a property selected from the group consisting of: a specific electrical resistance at a temperature of 350° C. and at an alternating current with a frequency of 50 Hz of greater than 1.0*10$^6$ Ohm·cm, a maximum load temperature $\theta_{Max}$ of at least 300° C., a coefficient of linear thermal expansion α in a range from 2.0*10$^{-6}$/K to 10*10$^{-6}$/K, a relationship of a product of the maximum load temperature $\theta_{Max}$ and the coefficient of linear thermal expansion α of: $600 \cdot 10^{-6} \leq \theta_{Max} \cdot \alpha < 8000 \cdot 10^{-6}$, and combinations thereof.

16. A sheet-like discrete element made of glass for use in an electrical storage system, comprising:
   a glass substrate having a surface; and
   a barrier layer on the surface, the barrier layer being a barrier against the diffusion of lithium,
   wherein the barrier layer wherein the barrier layer comprises an element selected from the group consisting of a nitride of Si, oxide of Si, carbide of Si, nitride of Al, nitride of Cr, nitride of Ti, nitride of Zr, nitride of Hf, nitride of Ta, oxide of Al, oxide of Cr, oxide of Ti, oxide of Zr, oxide of Hf, oxide of Ta, and any combinations thereof,
   wherein the barrier layer provides to direct diffusion paths into the glass, and
   wherein the glass substrate comprises glass is selected from any of the following composition ranges, in wt %:

|  | No. 1 | No. 2 | No. 3 | No. 4 | No. 5 |
|---|---|---|---|---|---|
| SiO$_2$ | 30-85 | 58-65 | 64-74 | 75-85 | 50-65 |
| B$_2$O$_3$ | 3-20 | 6-10.5 |  | 8-18 | 0-6 |
| Al$_2$O$_3$ | 0-15 | 14-25 |  | 0.5-4.5 | 15-20 |
| Li$_2$O |  |  |  |  | 0-6 |
| Na$_2$O | 3-15 |  | 6-10 | 1.5-5.5 | 8-15 |
| K$_2$O | 3-15 |  | 6-10 | 0-2 | 0-5 |
| MgO |  | 0-3 |  |  | 0-5 |
| CaO | 0-0.1 | 0-9 | 5-9 |  | 0-7 |
| BaO |  | 3-8 | 0-4 |  | 0-4 |
| ZnO | 0-12 | 0-2 | 2-6 |  | 0-4 |
| TiO$_2$ | 0.5-10 |  | 0-2 |  | 0-1 |
| ΣMgO + CaO + BaO |  | 8-18. |  |  |  |

17. The sheet-like discrete element as claimed in claim 16, wherein the glass further comprises from 0 to 1 wt % of refining agents selected from the group consisting of SnO$_2$, CeO$_2$, As$_2$O$_3$, Cl$^-$, F$^-$, and sulfates.

18. The sheet-like discrete element as claimed in claim 16, wherein the barrier layer comprises a vertical composition variation so as to provide no direct diffusion paths into the glass.

19. The sheet-like discrete element as claimed in claim 18, wherein the composition includes getter materials for alkali and/or alkaline earth metals.

20. The sheet-like discrete element as claimed in claim 16, wherein the composition is varied vertically by comprising a sequence of at least two layers having a different composition.

21. The sheet-like discrete element as claimed in claims 16, wherein the barrier layer is a plasma-assisted layer or an atomic layer deposition (ALD) layer.

22. The sheet-like discrete element as claimed in claim 16, wherein the glass substrate has a transmittance selected from the group consisting of: 0.1% or more in a range from 200 nm to 270 nm at a thickness of 30 μm; more than 0.5% at 222 nm at a thickness of 30 μm; more than 0.3% at 248 nm at a thickness of 30 μm; more than 3% in at 282 nm at a thickness of 30 μm; more than 50% at 308 nm at a thickness of 30 μm; more than 88% at 351 nm at a thickness of 30 μm; 0.1% or more in a range from 200 nm to 270 nm at a thickness of 100 μm; more than 0.5 % at 222 nm at a thickness of 100 μm; more than 0.3% at 248 nm at a thickness of 100 μm; more than 0.1% at 282 nm at a thickness of 100 μm; more than 30% at 308 nm at a thickness of 100 μm; and more than 88% at 351 nm at a thickness of 100 μm.

23. The sheet-like discrete element as claimed in claim 16, wherein the sheet-like discrete element has transmittance values that, due to the barrier layer, are reduced relative to those of the glass substrate by less than 60%.

24. The sheet-like discrete element as claimed in claims 16, wherein the barrier layer is amorphous.

25. The sheet-like discrete element as claimed in claim 16, wherein the glass substrate has a thickness variation of not more than 25 μm based on wafer or substrate sizes in a range of >100 mm in diameter.

26. The sheet-like discrete element as claimed in claim 16, wherein the glass substrate has a thickness selected from the group consisting of less than 2 mm, less than 1 mm, less than 500 μm, less than or equal to 200 μm, and not more than 100 μm.

27. The sheet-like discrete element as claimed in claim 16, further comprising a property selected from the group consisting of a water vapor transmission rate (WVTR) of $<10^{-3} g/(m^2 \cdot d)$, a specific electrical resistance at a temperature of 350° C. and at an alternating current with a frequency of 50 Hz of greater than $1.0*10^6$ Ohm·cm, a maximum load temperature $\theta_{Max}$ of at least 300° C., a coefficient of linear thermal expansion a in a range from $2.0*10^{-6}$/K to $10*10^{-6}$/K, a relationship of a product of the maximum load temperature $\theta_{Max}$ and the coefficient of linear thermal expansion α of: $600 \cdot 10^{-6} < \theta_{Max} \cdot \alpha < 8000 \cdot 10^{-6}$, and combinations thereof.

28. A sheet-like discrete element made of glass for use in an electrical storage system, comprising:
    a glass substrate having a surface; and
    a barrier layer on the surface, the barrier layer being a barrier against the diffusion of lithium and comprising $Si_3N_4$, wherein the glass substrate comprises glass is selected from any of the following composition ranges, in wt %:

|  | No. 1 | No. 2 | No. 3 | No. 4 | No. 5 |
|---|---|---|---|---|---|
| $SiO_2$ | 30-85 | 58-65 | 64-74 | 75-85 | 50-65 |
| $B_2O_3$ | 3-20 | 6-10.5 |  | 8-18 | 0-6 |
| $Al_2O_3$ | 0-15 | 14-25 |  | 0.5-4.5 | 15-20 |
| $Li_2O$ |  |  |  |  | 0-6 |
| $Na_2O$ | 3-15 |  | 6-10 | 1.5-5.5 | 8-15 |
| $K_2O$ | 3-15 |  | 6-10 | 0-2 | 0-5 |
| MgO |  | 0-3 |  |  | 0-5 |
| CaO | 0-0.1 | 0-9 | 5-9 |  | 0-7 |
| BaO |  | 3-8 | 0-4 |  | 0-4 |
| ZnO | 0-12 | 0-2 | 2-6 |  | 0-4 |
| $TiO_2$ | 0.5-10 |  | 0-2 |  | 0-1 |
| ΣMgO + CaO + BaO |  | 8-18. |  |  |  |

29. The sheet-like discrete element as claimed in claim 28, wherein the barrier is a PICVD layer.

30. The sheet-like discrete element as claimed in claim 28, wherein the barrier is an MF sputtered layer.

* * * * *